US009434893B2

(12) United States Patent
Dufresne

(10) Patent No.: US 9,434,893 B2
(45) Date of Patent: Sep. 6, 2016

(54) PROCESS FOR THE START-UP OF HYDROTREATMENT OR HYDROCONVERSION UNITS

(71) Applicant: EURECAT S.A., La Voulte sur Rhone (FR)

(72) Inventor: Pierre Dufresne, Valence (FR)

(73) Assignee: EURECAT S.A., La Voulte sur Rhone (FR)

( * ) Notice: Subject to any disclaimer, the term of this patent is extended or adjusted under 35 U.S.C. 154(b) by 590 days.

(21) Appl. No.: 13/862,673

(22) Filed: Apr. 15, 2013

(65) Prior Publication Data

US 2014/0251870 A1    Sep. 11, 2014

(30) Foreign Application Priority Data

Mar. 6, 2013 (FR) ...................................... 13 51993

(51) Int. Cl.

| *C10G 65/02* | (2006.01) |
|---|---|
| *C10G 45/08* | (2006.01) |
| *C10G 47/02* | (2006.01) |
| *C10G 47/06* | (2006.01) |
| *C10G 45/04* | (2006.01) |
| *C10G 45/46* | (2006.01) |
| *C10G 45/60* | (2006.01) |
| *C10G 45/06* | (2006.01) |
| *C10G 47/04* | (2006.01) |
| *C10G 65/04* | (2006.01) |
| *C10G 65/10* | (2006.01) |
| *B01J 37/20* | (2006.01) |
| *B01J 23/882* | (2006.01) |

(52) U.S. Cl.
CPC .............. *C10G 65/02* (2013.01); *B01J 23/882* (2013.01); *B01J 37/20* (2013.01); *C10G 45/04* (2013.01); *C10G 45/06* (2013.01); *C10G 45/08* (2013.01); *C10G 45/46* (2013.01); *C10G 45/60* (2013.01); *C10G 47/04* (2013.01); *C10G 47/06* (2013.01); *C10G 65/04* (2013.01); *C10G 65/10* (2013.01); *C10G 2300/703* (2013.01)

(58) Field of Classification Search
CPC ...... C10G 45/06; C10G 45/08; C10G 47/04; C10G 47/06; C10G 47/36; C10G 65/04; C10G 65/10; C10G 65/12
See application file for complete search history.

(56) References Cited

U.S. PATENT DOCUMENTS

| 3,458,433 A | 7/1969 | Wood et al. |
| 4,211,634 A * | 7/1980 | Bertolacini et al. ............ 208/59 |

FOREIGN PATENT DOCUMENTS

| EP | 0122180 A1 | 10/1984 |
| GB | 1324034 A | 7/1973 |

OTHER PUBLICATIONS

Gruia, Adrian, Handbook of Petroleum Processing, Chapter 7: Distillate Hydrocracking, pp. 305-306, 2006 (no month).*
An Introduction to Petroleum Refining and the Production of Ultra Low Sulfur Gasoline and Diesel Fuel, p. 3, Oct. 2011.*
Search Report dated Oct. 18, 2013 issued in corresponding FR 1351993 application (pp. 1-2).

* cited by examiner

*Primary Examiner* — Renee E Robinson
(74) *Attorney, Agent, or Firm* — Millen White Zelano and Branigan, PC; John Sopp; Csaba Henter

(57) ABSTRACT

The invention describes a process for start-up of a hydrotreatment or hydroconversion unit carried out in the presence of hydrogen, in at least 2 catalytic beds, process in which
  At least one bed contains at least one presulfurized and preactivated catalyst and at least one catalytic bed that contains a catalyst whose catalytic metals are in oxidized form,
  A so-called starting feedstock, which is a hydrocarbon fraction that contains at least 0.5% by weight of sulfur, lacking olefinic compounds and not containing an added sulfur-containing compound, passes through a first catalytic bed that contains said presulfurized and preactivated catalyst and then passes through at least one catalytic bed that contains a catalyst whose catalytic metals are in oxidized form,
  And the first presulfurized and preactivated catalyst bed reaches a temperature of at least 220° C.

18 Claims, No Drawings

PROCESS FOR THE START-UP OF HYDROTREATMENT OR HYDROCONVERSION UNITS

The invention relates to the processes for hydrotreatment or hydroconversion of petroleum feedstocks.

They make it possible to eliminate the sulfur and nitrogen hetero-elements as well as to modify the carbon-containing skeleton of the hydrocarbons.

These processes implement reactions of hydrotreatment (hydrodesulfurization, hydrodenitration, and hydrogenation of unsaturated compounds) and, in some cases, reactions of hydroconversion (hydrocracking, hydroisomerization), which are promoted by catalysts whose active phases contain metal sulfides. These processes are implemented in units that can contain one or more reactors placed in series, with each reactor being able to contain one or more catalytic beds.

The catalysts that are used for the hydrotreatment and hydroconversion reactions contain a substrate (for example, alumina, silica, silica-alumina, zeolite, alumina boron, by itself or in a mixture) and at least one hydrogenating-dehydrogenating element, such as at least one metal from the non-noble groups VI and/or VIII (for example, molybdenum, tungsten, cobalt, nickel). In general, a pair of two of these metals, for example one of the cobalt-molybdenum, nickel-molybdenum, nickel-tungsten pairs, is used.

The hydrotreatment reactions are generally carried out in the presence of hydrogen, between 200 and 400° C., under a pressure of between, for example, 5 and 200 bar, with a volumetric flow rate (expressed in terms of liters of feedstock injected per liter of catalyst and per hour) of between 0.2 and 8 h-1. These are, for example, hydrotreatments of naphtha, kerosene or diesel fuel fractions, or else hydrotreatments of vacuum distillates, in pretreatment of catalytic cracking or hydrocracking, or hydrotreatments of heavier feedstocks such as atmospheric residues or vacuum residues.

The metal phases of new catalysts are in general oxides at the end of their preparation. These are also oxides after regeneration. However, the metals of these catalysts are active for these reactions only in sulfurized form. It is therefore necessary to perform a sulfurization and an activation of the catalyst prior to its use. The sulfurization can be done in-situ, i.e., in the reactor of the reaction, or ex-situ, i.e., outside of the reactor.

In-situ sulfurization is carried out on the catalyst that is loaded into the reactor by injecting a sulfur-containing compound in a sufficient amount to allow the transformation of metal oxides of the catalyst into sulfides. This sulfur-containing agent is of the sulfide, disulfide or polysulfide type; in some case, it is directly hydrogen sulfide ($H_2S$). Most often, DMDS (dimethyl disulfide), DMS (dimethyl sulfide) or TBPS (tert-butyl polysulfide) are used, added to a feedstock. The amount of injected sulfur is in general a bit higher than the stoichiometry that is necessary for transforming oxides into sulfides, often 5 to 15% by weight of sulfur relative to the weight of catalyst, according to the following reaction for an NiMo-type catalyst:

The final sulfurization temperature is often quite close to the reaction temperature (temperature that is selected for the reaction). In general, it is higher than 250° C., and often around 300-350° C. The sulfurization procedure in the presence of hydrogen can last from several hours to several days, often from 12 to 36 hours.

In the most frequent case where the sulfur-containing compound is DMDS, the procedure in general comprises two major stages: the first consists in injecting DMDS at a moderate temperature, often between 200 and 250° C., and then in expecting that the entire reactor has been brought into contact with this compound. This point is verified by monitoring the partial pressure of hydrogen sulfide ($H_2S$) at the outlet of the reactor. Once $H_2S$ is detected, the procedure continues by a gradual rise in temperature up to the final activation temperature, close to 300-350° C. Having arrived at this level, the catalyst is considered to be activated, and the stage for hydrotreatment of the feedstock to be treated can be carried out.

The three primary sulfurizing agents are DMDS, TBPS, and DMS, with the first being by far the most used. One of the primary reasons for the advantage of DMDS is its relative ease in being transformed into $H_2S$ under the start-up conditions on a non-activated catalyst. It is generally assumed that it is well broken down at 220° C. The DMS has the drawback of being more stable and requiring a temperature that is 60 to 80° C. higher. Thus, the risk of reduction of the oxide radicals of the catalyst is higher, a risk that many operators do not want to take. The polysulfides such as TBPS also have the advantage of easy decomposition such as DMDS, and even easier (at approximately 20° C. lower). They can have certain other drawbacks, in particular a higher viscosity.

Thus, the sulfurization by means of a hydrogen sulfide mixture that is generally diluted in hydrogen ($H_2S/H_2=0.5$-5% by volume) and that is preferably carried out by temperature stages (EP-B-64429) is described in the prior art (U.S. Pat. No. 4,334,982).

This prior art (EP-64429) also describes a process for in-situ sulfurization with a liquid sulfurization feedstock that contains 5-20% by weight of aromatic compounds, lacking diolefinic and olefinic compounds, and that contains a sulfur-containing compound (DMDS).

This in-situ sulfurization makes it possible to fix in the catalyst generally approximately 50 to 110% of the stoichiometric amounts of sulfur calculated for the amounts of sulfur of the formula (according to the metals that are present), $CoS$, $NiS$, $MoS_2$ and $WS_2$.

Sulfurization can also be performed without adding sulfur-containing compound. This method is called feedstock sulfurization. In the cases where a liquid feedstock of direct-distillation diesel fuel type is available, and where this feedstock has a high sulfur content, for example greater than 0.5% by weight, and, better, 1% by weight, it is possible to take advantage of this sulfur for sulfurizing the catalyst.

Nevertheless, this method is little used because it has several drawbacks. The first is that it is generally assumed that the performance level of the thus sulfurized catalyst is rather lower than the method where a sulfur-containing agent is added to the feedstock. The second is that it requires a clearly more significant time period. Actually, the sulfur that is contained in a diesel fuel feedstock, for example, is only partially available for being transformed into $H_2S$. However, regardless of the sulfurization method selected, it is indeed $H_2S$ that is the sulfurizing agent that will perform the transformation of the metal oxides into sulfides. In the case of the so-called sulfurization with the feedstock, this sulfur is less available since the catalyst is not active for transforming it since it is still in the oxide state.

The common risk with all of the sulfurization methods is that the catalyst is in contact with hydrogen, in particular under high pressure, and in the absence of H₂S at excessive temperatures, in general estimated at 250° C. at any point of the catalyst. With this method of sulfurization with the feedstock, this risk is high because of the difficulty in generating H₂S; thus, it is necessary to very slowly increase the temperature for preventing this risk, which causes this method to be very long.

In the text below, reference will be made again to this concept of "available sulfur" that is potentially present in the petroleum feedstocks.

In-situ sulfurization with the addition of sulfurizing agent is extensively made in the industry today. It nevertheless has several drawbacks.

The first and primary drawback is the necessity in general of handling a sulfur-containing compound, such as DMDS, which has an environmental risk, in particular a very strong odor in the event of even very small leaks, which can give rise to an alert with residents on the site.

Among the other drawbacks, the period that is necessary for in-situ activation will be cited, a well-conducted procedure in general requiring between 12 and 24 hours, and longer in some particular cases. Another drawback is the relative technical difficulty of the protocol, which requires specialized and trained personnel, since strict execution of all of the phases of the procedure is critical for the future proper operation of the reactor so as to obtain a very active catalyst.

This is the reason for which processes for sulfurization are developed where the catalyst is sulfurized ex-situ, or off-site, and then loaded into the reactor with the sulfur content corresponding to the stoichiometric amount that is necessary for the metal sulfides. These processes are categorized in 2 large families: the simple sulfurization processes and the sulfurization and activation processes.

In the first category, the catalyst contains the proper sulfur content corresponding to the sulfides CoS, NiS, MoS₂, and WS₂. These processes have the advantage of providing the sulfur of which the catalyst has need and thus eliminate the necessity for injection of an exogenic sulfur-containing compound. This ex-situ sulfurization can be implemented according to various processes. Thus, the Sulficat process (U.S. Pat. No. 4,530,917) comprises a first preliminary stage, carried out in the absence of hydrogen, for incorporation in the porosity of the catalyst of a sulfur-containing compound (such as an organic polysulfide) in solution in a solvent. The catalyst is loaded into the reactor. In a second stage, carried out "in situ," an activation of the catalyst is carried out in the presence of hydrogen and at a temperature that is higher than 100 or 150° C. and generally at most 400° C. The necessary amount of sulfur and only the required amount of sulfur is thus introduced into the catalyst. The catalyst is therefore delivered prepackaged to the user and ready to be activated. The start-up phase of the reaction can then begin. Below, the process described above is enhanced by adding elementary sulfur in a determined amount to the organic polysulfide (U.S. Pat. No. 5,139,983).

The U.S. Pat. No. 5,681,787 describes another sulfurization process that belongs to this first category. It comprises the stages: (a) Bringing the catalyst into contact with elementary sulfur at a temperature such that at least a portion of the sulfur is incorporated into the pores of the catalyst, and then (b) bringing the catalyst into contact with an oxidized hydrocarbon molecule having at least 12 carbon atoms, with the catalyst that is obtained having reduced self-heating in comparison with catalysts that have not undergone stage (b).

The second family of ex-situ processes relates to the processes for presulfurization and activation.

In the Totsucat process of the applicant, the catalyst is not simply presulfurized; it is also preactivated and therefore loaded into the reactor in the active state and ready for use. This process is the object of several patents.

In the process described in EP-785022, sulfur is incorporated ex-situ in the pores of the catalyst, which is in the form of a moving catalyst bed, in the presence of hydrogen, and in the presence either of hydrogen sulfide or a sulfur-containing compound that can break down, in the presence of hydrogen, into hydrogen sulfide.

The temperature is between 80 and 450° C., preferably between 110 and 400° C. The moving catalytic bed is, for example, a moving bed, a circulating bed, a fluidized bed, an expanded bed, a boiling bed, or a bed of the band or rotating type.

At the end of the Totsucat process, a presulfurized catalyst is obtained that contains at least 50% sulfur, and at most 110% sulfur, corresponding to the stoichiometric amount of metal sulfides deposited on the surface of the catalyst. This catalyst contains the entire amount of sulfur that is necessary for the reaction that is considered and only this amount; there are no free sulfur-containing compounds. Actually, owing to the treatment stage in the presence of hydrogen, this sulfur is present in the metal sulfide state.

This catalyst is packaged, delivered to the user, and loaded into the reactor.

The U.S. Pat. No. 5,958,816 (Tricat) also describes a process for preparing a presulfurized/activated catalyst, a process that is carried out with a catalyst in motion in a boiling or expanded bed and sulfurized/activated in an H₂S/H₂ mixture.

A decisive advantage of this ex-situ sulfurization is that the catalyst that is loaded into the reactor already contains the necessary amount of sulfur and is already activated and therefore already ready to be used as active catalyst. This particular feature saves time that is precious to the user and considerably simplifies the start-up procedure. The user only has to start up the reaction by injection of the feedstock that is to be treated.

The prior art is therefore summarized with three sulfurization-activation techniques of the hydrotreatment/hydroconversion catalysts:

1. In-situ sulfurization with feedstock of an oxide-charged catalyst in the reactor.
2. In-situ sulfurization, with a feedstock to which a sulfurizing agent is added, of an oxide-charged catalyst in the reactor.
3. Ex-situ sulfurization, with the two families: simply presulfurized, and presulfurized/preactivated. The catalyst that is simply presulfurized ex-situ is charged as is and undergoes in-situ final activation in the presence of hydrogen. The presulfurized/preactivated catalyst is charged as such and is directly ready for use.

Each technique offers advantages, but also drawbacks that this invention clearly intends to resolve:

1. In-situ sulfurization with feedstock is economical, but it takes a very long time and is of occasionally questionable performance,
2. In-situ sulfurization with a feedstock to which a sulfurizing agent is added provides good results but poses the problem of handling evil-smelling and toxic products,
3. Ex-situ sulfurization without activation exhibits the drawback of also having to execute an in-situ activation. Ex-situ sulfurization with activation is perfect in terms of ease and rapidity of start-up, but it exhibits the rather fatal drawback of higher cost, compared to in-situ sulfurization, in particular for large units containing large amounts of catalysts, units for example with more than 100 m³ of catalyst. The off-site sulfurizations can also exhibit the drawback of having to charge a catalyst that may have a certain sensitivity to air, which can significantly complicate the charging procedure.

DESCRIPTION OF THE INVENTION

The applicant noted that it was possible to combine these three methods into a single method, which, in an unexpected manner, eliminates or at least reduces the drawbacks of each of these three methods and substantially preserves the advantages.

According to the invention, the sulfur with feedstock, as Method 1, is used without adding sulfurizing agent, contrary to Method 2.

More specifically, it consists in loading into the unit both the presulfurized-preactivated catalyst, as in Method 3, and the oxide catalyst, like Method 2.

The invention relates more specifically to a process for start-up of a hydrotreatment or hydroconversion unit that is carried out in the presence of hydrogen, in at least 2 catalytic beds, in which
   At least one bed contains at least one presulfurized and preactivated catalyst, and at least one catalytic bed contains a catalyst whose catalytic metals are in oxidized form,
   A so-called starting feedstock, which is a hydrocarbon-containing fraction containing at least 0.3% by weight of sulfur, lacking in olefinic compounds and not containing an added sulfur-containing compound, passes through a first catalytic bed that contains said presulfurized and preactivated catalyst and then passes through at least one catalytic bed that contains a catalyst whose catalytic metals are in oxidized form,
   And the first presulfurized and preactivated catalyst bed reaches a temperature of at least 220° C.

Advantageously, the bed that contains the catalyst whose metals are in oxidized form is kept at a temperature of 210-250° C. that is lower by 10-30° C. than that of the first bed.

In an advantageous way, the feedstock passes through all of the catalytic beds containing said presulfurized and preactivated catalyst and then passes through all of the catalytic beds containing catalyst whose catalytic metals are in oxidized form.

In a preferred way, said feedstock circulates in downward flow.

A necessary condition of the invention is therefore that the presulfurized-preactivated catalyst is loaded at the top of the flushed catalytic beds. The oxide catalyst is then loaded into at least one subsequent bed.

In a preferred way, the catalytic beds are loaded into the same reactor, with the presulfurized and preactivated catalyst being loaded into the bed(s) at the top of the reactor and the starting feedstock circulating in downward flow. The oxide catalyst is then loaded into the beds at the bottom of the reactor.

A typical scheme is that the presulfurized-preactivated catalyst is loaded into the upper bed of a reactor that comprises 2 catalytic beds and that the oxide catalyst is loaded into the lower bed of the same reactor.

In the case of a unit with 2 reactors arranged in series, in general, the first reactor is at least in part loaded with an ex-situ activated sulfur-containing catalyst, and the second is loaded with the oxide catalyst.

One advantage of the invention, and in particular preferred loading modes, is also that, since the loading of the catalyst into the lower bed is a little more complicated for a presulfurized catalyst that is sensitive to air, the procedure is simplified since the presulfurized/preactivated catalyst is loaded only into the upper bed.

Thus, the invention relates more specifically to a process for start-up of a hydrotreatment unit that consists in loading the upper portion of the catalytic beds with an ex-situ activated sulfur-containing catalyst and the lower portion with an oxide catalyst (abbreviated term for the catalyst whose metals are in oxidized form).

The principle of the invention is that the presulfurized/preactivated catalyst that is placed in the first bed (at the top) can transform the sulfur-containing molecules, which are said to be easy to transform, into hydrogen sulfide, at moderate temperature, and that this H₂S can in its turn sulfurize the oxide catalyst.

These molecules that are said to be easy to transform—sulfides, mercaptans, light thiophenic compounds—are more difficult to transform than the conventional sulfurizing agents that are TBPS (tert-butyl polysulfide), DMDS or DMS. Nevertheless, and this is the surprise of the invention, the activated nature of the top catalyst makes it possible to transform an entire series of sulfur-containing molecules into H₂S under relatively mild conditions, i.e., at moderate temperature.

One condition of proper operation is that the liquid sulfurization feedstock contains an appreciable amount of sulfur and is lacking in olefinic compounds.

The feedstock that is to be treated circulates in general in downward flow. It first passes over at least one catalytic bed that contains at least one presulfurized and preactivated catalyst, and then it passes over at least one catalytic bed that contains at least one catalyst in oxidized from. Preferably, the feedstock passes through all of the catalytic beds that contain said presulfurized and preactivated catalyst, and then it passes through all of the catalytic beds that contain catalyst whose catalytic metals are in oxidized form.

The presulfurized and preactivated catalyst contains 50 to 110% sulfur corresponding to the stoichiometric amount of metal sulfides, and preferably 80 to 110%. It does not comprise a free sulfur-containing compound. It was activated ex-situ by at least one treatment under hydrogen. It is, for example, a catalyst that is prepared according to the Totsucat process described above.

The composition of the catalyst, whether it is in oxide form or presulfurized/preactivated form, is conventional and corresponds to the catalysts that are described in the prior art and presented above.

The catalyst in oxidized form and/or the presulfurized/preactivated catalyst contain(s) metals of groups VIII and VIB, in particular Co, Ni, Mo, and W. In general, it contains a substrate of alumina, silica, silica-alumina, zeolite, or alumina-boron, by itself or in a mixture.

These are primarily the catalysts CoMo, or NiMo, or NiW.

These can also be bulk catalysts without substrates that therefore contain large amounts of metals of groups VI and VIII, for example of the Ni, Mo and W type.

These catalysts in presulfurized-preactivated form or in oxidized form are new catalysts or regenerated catalysts.

The ratio between, on the one hand, the weight of the presulfurized/preactivated catalyst and, on the other hand, the weight of the catalyst whose catalytic metals are in oxidized form is 0.25 to 4, and preferably 0.5 to 2.

The charging of the catalytic beds in the reactor can advantageously be done by charging the lower bed or beds with catalyst whose catalytic metals are in oxide form, a charging taking place in air, and then by charging the bed or beds above with the presulfurized-preactivated catalyst, with this charging being able to take place in nitrogen if the catalyst does not receive any passivation treatment that is adequate for allowing a charging in air.

After charging the catalysts in the corresponding catalytic beds, the start-up process is implemented with a so-called starting feedstock until sulfurization of the catalyst containing metals in oxidized form is completed. After activation, the supply of the starting feedstock is then stopped, and the feedstock to be treated is introduced.

This start-up process can relate to all of the types of hydrotreatment and hydroconversion. Nevertheless, its advantages are reduced with feedstocks that are not very charged with sulfur, such as naphthas, and even kerosenes. It actually makes perfect sense for the units for hydrotreatment of diesel-fuel-type distillates. It may also be applied for heavier feedstocks than the diesel fuels, such as vacuum diesel fuels (or vacuum gas oils).

The start-up process is carried out with a so-called liquid starting feedstock that circulates in general in downward flow. The downward flow is the type of flow that is preferred in the processes for hydrotreatment and hydroconversion as being the easiest to use on a large scale for the fixed-bed processes, compared to a rising flow.

Preferably, a monitoring of temperatures is performed. In a preferred way, it is carried out by injecting a quench gas between the catalytic bed(s) containing said presulfurized and preactivated catalyst and the catalytic bed(s) containing said catalyst whose metals are in oxidized form.

The process is carried out advantageously in multi-bed reactors that are separated by gas quenches.

This thus makes possible a certain separate monitoring of the temperature of each bed, and in particular the temperature of the oxide bed(s) can be kept at a temperature that is slightly lower by several degrees or tens of degrees than that of the presulfurized/preactivated catalyst bed(s), called first bed(s).

The process is performed according to the following stages after catalytic beds are charged and the conventional stages, such as purging of air by nitrogen, the introduction of hydrogen, and the pressurization of the unit:

a) After an optional drying, in the presence of a starting feedstock that does not contain an added sulfur-containing compound, in the presence of hydrogen, the temperature of the first bed that contains the presulfurized and preactivated catalyst is brought to 220-280° C., or 220-270° C., preferably 230-270° C.; the temperature of the bed containing the catalyst whose metals are in oxidized form is brought to 210-250° C., preferably 220-250° C., and is lower by 10-30° C. than that of said first bed, b) In the presence of hydrogen sulfide at the outlet of said catalyst bed whose metals are in oxidized form, the temperature of said bed that contains the oxide catalyst is brought to 320-350° C. and then held there.

More specifically:

a) The temperature of the beds is gradually increased in the presence of hydrogen circulation. A drying time, preferably to 120-130° C., can be observed to allow the oxide-type catalyst to evacuate water.

The temperature of the preactivated, presulfurized catalyst bed (first bed) is gradually brought to 220-280° C., or 220-270° C., preferably 230-270° C., on average, for example, around 250° C., and kept on a plateau at this level to allow hydrogen sulfide to be generated.

The bed ($2^{nd}$ bed) that contains the oxide catalyst is kept at a temperature that is slightly lower by 10-30° C. than that of the first bed, namely 210-250° C., preferably 220-250° C., and on average, for example, 230° C., for allowing the hydrogen sulfide that is generated in the $1^{st}$ bed to diffuse into the $2^{nd}$ bed.

The temperature of the bed that contains the oxide catalyst should be such that this catalyst is not damaged under hydrogen pressure and in the absence of $H_2S$. Actually, a certain reduction of the $MoO_3$ phase into $MoO_2$ can occur in the absence of $H_2S$, which would then come to disrupt the formation of the proper sulfurized active phase.

b) When the partial pressure of hydrogen sulfide begins to increase at the outlet of the bed(s) containing oxide catalyst, it is possible to pass to the next start-up phase that consists in finalizing the activation of the oxide catalyst. The hydrogen sulfide that is produced will sulfurize the catalyst whose metals are in oxidized form. The temperature is brought to 320-350° C., in a gradual way by maintaining a monitoring of the $H_2S$ partial pressure. It is essential that the production of $H_2S$ of the activated catalyst bed(s) always compensates for the consumption of the last oxide catalyst bed(s).

The final plateau at this temperature lasts—at a minimum—approximately 4 hours and often 6 to 8 hours. It is possible, but not truly necessary, to carry out this plateau longer, with the activation being terminated at this level.

The generation of $H_2S$ in the first catalytic bed is done via hydrodesulfurization reactions when the temperature of the catalytic bed containing the presulfurized and preactivated catalyst generally reaches 220° C.

This generation is made possible because the presulfurized catalyst performs a hydrodesulfurization of the starting feedstock that contains a type of sulfur that can be easily removed by hydrodesulfurization at moderate temperature, lower than the temperature that would be necessary for having total hydrodesulfurization, namely an elimination of all of the types of sulfur-containing compounds, including the most refractory compounds.

The selection of the starting feedstock therefore relates to feedstocks containing high sulfur contents and sulfur that is easy to eliminate. These are, for example, atmospheric diesel fuels. These are fractions whose initial boiling point is generally between 210° C. and 250° C., most often between 230 and 250° C., and the final boiling point is generally from 350 to 380° C. The sulfur-containing compounds for which the sulfur can be easily eliminated are mercaptans and sulfides, as well as light thiophenic compounds.

Said feedstock contains at least 0.3%, and preferably at least 0.5%, by weight of sulfur, in an even more preferred way at least 0.7% by weight of sulfur, and in an advantageous manner at least 0.9% by weight of sulfur, and it does not contain added sulfur-containing compound. It is a feedstock that is conventionally employed for this purpose. Usually, it is a straight-run diesel fuel obtained from the atmospheric distillation of crude. It does not contain olefinic compounds (olefins, diolefins, . . . ). Therefore, it will not be obtained from cracking processes such as coking, visbreaking, catalytic cracking and steam-cracking. It contains mercaptans and/or sulfides and/or light thiophenic compounds.

Thus, the starting feedstock is preferably a straight-run diesel fuel that is obtained from the atmospheric distillation of crude.

Advantageously, a monitoring of the partial pressure of hydrogen sulfide at the outlet of the last catalytic bed containing the catalyst in oxidized form, or at the outlet of the reactor when it is unique, makes it possible to control the rise in temperature up to the sulfurization stage. Thus, stage b) is advantageously carried out when the partial pressure of hydrogen sulfide at the outlet of the last catalytic bed is higher than 0.2% by volume, and preferably 0.5% by volume.

When sulfurization is completed, as well as activation, the starting feedstock is stopped, and the feedstock that is to be treated is introduced under the conditions of the reaction to be carried out. In some cases, the feedstock that is to be treated can be used as a starting feedstock if it meets the criteria indicated, which are that they contain enough sulfur and are lacking in olefins.

By performing the start-up process according to the invention, it was possible to note the following advantages:
  Limitation of the "popcorn" effect; this effect is due to a condensation of water in the bottom of the catalytic bed and in a rapid heating in the presence of a liquid feedstock, which causes too rapid a drying damaging the catalyst,
  Quality of formation of the sulfurized active phase of the catalyst in oxidized form, in particular due to the absence of the formation of the $MoO_2$ phase that can occur in the presence of H2 and in the absence of H2S; this phase that is formed by reduction of $MoO_3$ counteracts the sulfurization process,
  Limitation of coking of the catalyst in oxidized form; actually under the influence of too reactive a feedstock (presence of olefins) or too heavy a feedstock or too high a temperature or too low a partial pressure of hydrogen; the catalyst in oxidized form has a tendency to coke.

The pressure of the processes according to the invention is 5 to 300 bar, expressed in terms of total pressure of the unit, and more generally between 20 and 200 bar.

EXAMPLES

Example 1

For Comparison—Sulfurization with Feedstock

A commercial catalyst of the Albemarle KF757 reference CoMo/alumina type is adopted as a reference. A 10 ml volume is loaded into a reactor of a catalytic test unit. The purpose of this first example is to illustrate a start-up carried out with a non-additive diesel fuel feedstock.

The feedstock that is used is a straight-run diesel fuel with a density of 0.839 g/ml, a sulfur content of 1.20% by weight, a nitrogen content of 0.0102% by weight, an aromatic content of 28.3% by weight, boiling points at 5% distilled of 211° C. and at 95% distilled of 366° C.

The reactor is pressurized at 40 bar. The feedstock is injected into the reactor at a flow rate of 20 ml/h (hourly volumetric flow rate of 2), and the temperature is brought to 250° C. in 8 hours. The H2/HC ratio is 300 (expressed in terms of gaseous liters per liquid liters). A plateau of 4 hours is preserved at this temperature. Next, the temperature is brought to 320° C. in 4 hours. At this stage, the activation of the catalyst is considered to be terminated.

The HDS test per se can start up. The temperature is brought to 340° C. for 40 hours, then 345° C. for 30 hours, and then 350° C. for 30 hours. At each stage, 3 samples of effluent are sampled and analyzed for their sulfur content.

The mean sulfur contents at each temperature are respectively 63 ppm, 31 ppm, and 13 ppm.

Example 2

For Comparison—Sulfurization with Additive Feedstock

The same experiment is strictly repeated, if it is only the diesel fuel feedstock that is used as an additive with dimethyl disulfide (DMDS) at a level of 3% by weight, which corresponds to 2.04% by weight of sulfur. This feedstock is injected up to the temperature of 320° C. It is next replaced by non-additive diesel fuel for the test.

Example 3

For Comparison—Presulfurized-Preactivated Catalyst

The same catalyst as the one of Example 1, KF757 CoMo, is presulfurized according to the Totsucat process. An amount of 100 ml underwent a treatment in an $H_2/H_2S$ gas mixture at a final temperature of 280° C. The contents of sulfur and carbon that are obtained are 12.4% and 6.2% by weight. A volume is 10 ml is loaded into the test unit, and the operating procedure then is similar to that of Example 1, with the same diesel fuel feedstock.

The diesel fuel that is used in Example 1 is injected. The temperature is brought to 250° C. in 8 hours, and then without leveling off (unnecessary for a presulfurized-preactivated catalyst) to 320° C. in 4 hours. The test is then conducted with the same operating procedure as in Example 1.

Example 4

Invention—Mixed Oxide Catalyst/Presulfurized-Preactivated Catalyst Charge

The reference KF757 catalyst is used both in oxide form and in presulfurized/preactivated form. 5 ml of oxide is loaded at the bottom of the reactor, and 5 ml of presulfurized catalyst (that of Example 3) is loaded at the top. Next, the same operating procedure as in Example 1 is used (40b, H2/HC=300, VVH=2, DMDS non-additive feedstock).

The temperature is brought to 250° C. in 8 hours, left for 4 hours, and then brought to 320° C. in 4 hours.

The HDS test is carried out under the same conditions at 3 temperatures of 340° C., 345° C. and 350° C.

Results

The results are brought into the table below. The sulfur contents of the effluents at 3 temperatures as well as the calculation of the HDS activity are indicated there, by adopting as reference 100 the in-situ sulfurization with additive feedstock.

The sulfurization with feedstock according to Example 1 shows a lesser activity in the case of reference Example 2 with a DMDS additive feedstock. Example 4 according to the invention shows an equivalent activity (taking into account the uncertainty of the measurement) to that of the conventional sulfurization of an oxide catalyst by an additive feedstock.

| Example | | Start-Up | [S1] ppm | [S2] ppm | [S3] ppm | HDS (%) |
|---|---|---|---|---|---|---|
| 1 | Oxide Catalyst | GO | 63 | 31 | 13 | 89 |
| 2 | Oxide Catalyst | GO + DMDS | 43 | 20 | 9 | 100 |
| 3 | Presulfurized-Preactivated Catalyst | GO | 49 | 24 | 10 | 96 |
| 4 | Mixed Oxide Catalyst/Presulfurized-Preactivated Catalyst Charge | GO | 46 | 21 | 10 | 98 |

The invention claimed is:

1. A process for start-up of a hydrotreatment or hydroconversion reaction carried out in the presence of hydrogen, in at least 2 catalytic beds, comprising
at least one bed contains at least one presulfurized and preactivated catalyst, and at least one catalytic bed contains a catalyst whose catalytic metals are in oxidized form,
passing a starting feedstock, which is a hydrocarbon fraction that contains at least 0.3% by weight of sulfur, lacking olefinic compounds and not containing an added sulfur-containing compound, through a first catalytic bed that contains said presulfurized and preactivated catalyst and then passes through at least one catalytic bed that contains a catalyst whose catalytic metals are in oxidized form,
and the first presulfurized and preactivated catalyst bed reaches a temperature of at least 220° C.,
wherein the presulfurized and preactivated catalyst and the catalyst whose catalytic metals are in oxidized form are the same catalyst with the exception of their form being presulfurized and preactivated versus oxidized.

2. The process according to claim 1, wherein the feedstock passes through all of the catalytic beds containing said presulfurized and preactivated catalyst and then passes through all of the catalytic beds containing the catalyst whose catalytic metals are in oxidized form.

3. The process according to claim 1, wherein said feedstock circulates in downward flow.

4. The process according to claim 1, wherein the catalytic beds are loaded into the same reactor, with the presulfurized and preactivated catalyst being loaded into the bed(s) at the top of the reactor and the starting feedstock circulating in downward flow.

5. The process according to claim 1, wherein said presulfurized and preactivated catalyst contains 80 to 110% of sulfur corresponding to the stoichiometric amount of metal sulfides, does not comprise free sulfur-containing compound, and has been activated ex-situ by at least one treatment in hydrogen.

6. The process according to claim 1, wherein the catalyst in oxidized form and or the presulfurized-activated catalyst contain metals of groups VIII and VIB, and contain a substrate of alumina, silica, silica-alumina, zeolite, or alumina-boron, by itself or in a mixture.

7. The process according to claim 1, wherein the starting feedstock is a straight-run diesel fuel that is obtained from atmospheric distillation of crude.

8. The process according to claim 1 that operates according to the following stages after the catalytic beds are loaded:
a) after an optional drying, in the presence of a starting feedstock that does not contain an added sulfur-containing compound, in the presence of hydrogen, the temperature of the first bed that contains the presulfurized and preactivated catalyst is brought to 220-280° C.; the temperature of the bed containing the catalyst whose metals are in oxidized form is brought to 210-250° C., and is lower by 10-30° C. than that of said first bed,
b) in the presence of hydrogen sulfide at the outlet of said catalyst bed whose metals are in oxidized form, the temperature of said bed that contains the oxide catalyst is brought to 320-350° C. and then held there.

9. The process according to claim 8, wherein stage b) is carried out when the partial pressure of hydrogen sulfide at the outlet of the last catalytic bed is higher than 0.2% by volume.

10. The process according to claim 8, wherein stage b) is carried out when the partial pressure of hydrogen sulfide at the outlet of the last catalytic bed is higher than 0.5% by volume.

11. The process according to claim 1, in which a quench gas is injected between the catalytic bed(s) containing said presulfurized and preactivated catalyst and the catalytic bed(s) containing said catalyst whose metals are in oxidized form.

12. The process according to claim 1, wherein the ratio between the weight of presulfurized/preactivated catalyst and the catalyst weight whose catalytic metals are in oxidized form is 0.25 to 4.

13. The process according to claim 1, wherein the starting feedstock contains at least 0.5% by weight of sulfur.

14. The process according to claim 1, wherein the catalyst in oxidized form and the presulfurized-activated catalyst contain metals of groups VIII and VIB, selected from the group consisting of Co, Ni, Mo, and W, and contain a substrate of alumina, silica, silica-alumina, zeolite, or alumina-boron, by itself or in a mixture.

15. The process according to claim 1 that operates according to the following stages after the catalytic beds are loaded:
a) after an optional drying, in the presence of a starting feedstock that does not contain an added sulfur-containing compound, in the presence of hydrogen, the temperature of the first bed that contains the presulfurized and preactivated catalyst is brought to 230-270° C.; the temperature of the bed containing the catalyst whose metals are in oxidized form is brought to 220-250° C., and is lower by 10-30° C. than that of said first bed,
b) in the presence of hydrogen sulfide at the outlet of said catalyst bed whose metals are in oxidized form, the temperature of said bed that contains the oxide catalyst is brought to 320-350° C. and then held there.

16. The process according to claim 1, wherein the ratio between the weight of presulfurized/preactivated catalyst and the catalyst weight whose catalytic metals are in oxidized form is 0.5 to 2.

17. The process according to claim 1, wherein the bed that contains the catalyst whose metals are in oxidized form is kept at a temperature of 210-250° C. that is lower by 10-30° C. than that of the first bed.

18. The process according to claim 1, wherein the presulfurized and preactivated catalyst is loaded at the top of flushed catalytic beds.

* * * * *